UNITED STATES PATENT OFFICE.

WILLIAM BEACH PRATT, OF WELLESLEY, MASSACHUSETTS, ASSIGNOR TO RONDOUT RUBBER COMPANY, OF EAST DEDHAM, MASSACHUSETTS, A CORPORATION OF NEW YORK.

PROCESS OF DEVULCANIZING RUBBER.

1,382,669. Specification of Letters Patent. Patented June 28, 1921.

No Drawing. Application filed October 23, 1914, Serial No. 868,205. Renewed December 1, 1920. Serial No. 427,656.

*To all whom it may concern:*

Be it known that I, WILLIAM BEACH PRATT, a citizen of the United States, and resident of Wellesley, in the county of Norfolk and State of Massachusetts, have invented certain new and useful Improvements in Processes of Devulcanizing Rubber, of which the following is a specification.

Generally speaking, this invention has for its object the devulcanization or reclaiming of rubber, or, in other words, its purpose is to remove from vulcanized rubber more or less of the sulfur which was previously incorporated in the rubber in the process of vulcanization. In the practical use of rubber in various arts, it is employed in connection with fabrics, as for instance in the manufacture of tires, rubber boots and shoes; it is compounded with resins or asphalts and other hydrocarbons, and it has mixed with it various elements, such as pigments, etc.

While the invention, broadly considered, has for its purpose the removal of sulfur and the restoration of the vulcanized rubber to a state in which it possesses substantially the initial physical and chemical characteristics of pure rubber, nevertheless another and less important phase of the invention consists also in the elimination or removal of the foreign materials, whether they be organic, or inorganic, such as cellulose fibers, litharge or other compounds, as asphalts or other hydrocarbons.

In the vulcanization of rubber, the mineral sulfur is incorporated in the body of the rubber and the mixture is subjected to a temperature which ranges from 120° C. to 160° C. The subjection of the mixture to heat is continued for varying periods, according to the particular character of the compound or mixture, and the use to which the final product is to be put. I have discovered that, by the employment of an organic acid soluble in water, as for instance an organic dibasic acid, as a reagent, I am able to separate or free combined sulfur or sulfur of vulcanization from vulcanized rubber. By use of an acid of this character, sulfur, which was added and combined molecularly with the rubber in the vulcanizing process, may be separated from the rubber molecule and then left in the free mineral state (or combined with the metals or their oxids which are present in the stock or which may be added to the stock), or else removed subsequently by mechanical means, or by a chemical process in which is utilized a reagent, such as acetone. If desired, a solvent for free sulfur may be introduced into the acid solution, so that the sulfur as soon as freed may be removed, practically all in one treatment.

As a result of numerous experiments, I have discovered that desulfurization apparently takes place under similar conditions of heat and duration of time that the vulcanization was originally obtained. It is not generally known just what chemical reaction takes place in the vulcanization of rubber; but it is known, however, that at the temperatures of vulcanization, the sulfur assumes a colloidal or quasi-colloidal condition, and it is at the time when the sulfur is in this condition that the molecular rearrangement takes place. Irrespective of the theory of the chemical changes during the time of vulcanization, I have noted that, for the successful separation of combined sulfur in commercial quantities and at relatively low cost, approximately that temperature may be employed which will bring sulfur to a colloidal or quasi-colloidal state. That is, I have discovered that, if vulcanized rubber be heated in the presence of an organic acid soluble in water to approximately the temperature of vulcanization, a chemical reaction takes place, the result of which is the splitting off of sulfur from the rubber molecule, making it possible to recover sulfur in a free mineral state. One of the dangers to be guarded against in the process of devulcanization is the decomposition of the reagent. For instance, if oxalic acid, which decomposes at a temperature of approximately 160° C., is employed as the reagent, care must be taken that the temperature of devulcanization does not so closely approximate 160° C. as to cause the splitting up or decomposition of the oxalic acid. For all practical purposes, taking the various waste rubber products as they come, I find that on a commercial basis the devulcanization may be carried on practically and satisfactorily at temperatures ranging from 120° C. to 140° C. When oxalic acid is used, and the same is probably true of other organic acids of the class specified, it may be employed in a highly concentrated state, or, if desired, in a relatively weak solution, and the period of time to accomplish the devulcanization will depend, roughly, upon the strength of the solution that is employed and the temperature at which the stock is cooked. For instance, where a weak solution (for example, a saturated solution of oxalic acid and water at a normal temperature, say 20° C.) is employed, the period of time required for devulcanization is approximately 12 hours, at a temperature of 120° C., whereas, when the solution is increased in strength, the period of time required for devulcanization at the temperature mentioned decreases, all other things being equal.

Commercial rubber articles are vulcanized under differing conditions, e. g., one manufacturer may employ approximately 20% by weight of sulfur in the vulcanization of the rubber, and subject the compound to the vulcanizing temperature for a period of approximately 15 minutes, and another manufacturer may, on the other hand, employ 10% by weight of the sulfur and subject it to a vulcanizing temperature for an hour or more. In these two articles, therefore, there is a material difference in the proportion of combined sulfur in the rubber, and, as apparently in the devulcanization a chemical change takes place, there is a necessity, in carrying on the process on a large commercial basis, for the use of a proportionately larger quantity of the reagent, oxalic acid, than might in any one case be required for removal of the combined sulfur from the rubber. Moreover, as the sulfur will not again combine with the rubber in the presence of the dibasic acid in vulcanizing temperatures, there should preferably be always an excess of this reagent. Theoretically, one should use quantitatively the amount of the reagent necessary to abstract the quantity of free and combined sulfur in the rubber, plus an amount necessary to leave a slight excess of acid in the solution so that there may be no danger of the sulfur recombining with the rubber at the temperature to which the rubber is being heated. Of the organic acids soluble in water, I have found that my best results to date in devulcanizing vulcanized rubber have been secured by the employment of an organic dibasic acid, to wit, oxalic acid ($C_2H_2O_4$).

Another advantage that is secured by the use of the particular organic dibasic acid mentioned to wit oxalic acid, is due to its action upon textiles and its decomposition of those cellulose materials which are employed in practical rubber industries. That is to say, by the employment of the same reagent, I am not only able to devulcanize the rubber but also able to remove the cellulose materials which were previously incorporated therein in the manufacture of those waste products which are used in following out my process. The effect of the oxalic acid upon these cellulose fibers, as is well known, is to leave them in a charred or friable condition so that they may be easily washed out mechanically.

As an example of the best method now known to me of carrying out my process commercially, I present the following: Rubber articles to be treated, say worn out automobile tires or the like, are first disintegrated by grinding and are placed in a digester. To 100 pounds of the stock I add 50 pounds of crude oxalic acid, and sufficient water to cover the stock. This amount of water, roughly speaking, produces a substantially saturated solution at 80° C. The tank is then sealed. By a suitable heater, the contents of the digester are slowly heated under pressure to a temperature of approximately 100° C. and are kept thereat for about 15 or 20 minutes, after which the temperature is gradually raised to 140° C. and is maintained thereat under pressure for about 24 hours.

Then the stock is removed from the liquor and is subjected to a series of washings to remove the charred or friable cellulose fiber and that free mineral sulfur and compounding material which are adherent to the rubber. The free sulfur may also be removed by a suitable solvent. When the rubber is washed and the inorganic matter has been removed thereby, the rubber immediately swells and will be found to have a specific gravity less than that of water.

In actual practice, I have at times found it desirable to introduce an agent to soften the rubber. I have found that the terpenes, for instance turpentine or pine oil, may be employed. The stock may be previously treated with a small quantity of turpentine or a soluble pine oil before its treatment with acid: but I have found it convenient to add to the acid solution a small quantity, say 2 pounds for 100 pounds of rubber stock, of commercial pine oil. As a result, the rubber is softened and sulfur is freed or separated in visible particles. In this form the sulfur is more easily removed by the subsequent washing.

During the cooking process, the threads and other cellulose fibers, such as the canvas duck which is incorporated in vehicle tires, will be disintegrated and in some cases carbonized, and the foreign substances, such as pigments, resins and hydrocarbons, will separate from the rubber and will sink to the bottom of the liquor or be held in suspension therein, according to their natures.

From the waste liquor, I may subsequently reclaim the sulfur, litharge, hydrocarbons, etc., but this step forms no part of the present invention.

The commercial stock contains usually more or less litharge, zinc oxid, copper (from rivets), iron and other metals, either as such or as oxids, and it is probable that they further combine with the abstracted sulfur, for I have found, by analysis of the waste products, all of these elements present in combination with sulfur. I may add therefore a metal to the stock which will combine with the sulfur to form a sulfid or sulfate.

I have herein described one process in which the stock is subjected to heat in the presence of oxalic acid, but it is to be understood that my invention is not limited thereto. In fact, it is possible to practice my invention without using heat or pressure, but in such case the time element is greater, and as a result the product is not obtained at the low cost which seems desirable. For instance, I have found that simple immersion in a concentrated aqueous solution of oxalic acid, if continued for a long time, say seven to ten months, will result in the complete devulcanization of the stock. Again I prefer to grind the stock fine, but it is not essential for some purposes that the stock be ground at all. I have found that whole vulcanized articles may be treated merely for the purpose of counteracting or compensating for over-vulcanization and oxidation. Where vulcanized rubber articles are oxidized or are over-vulcanized, i. e. are subjected to too great heat or pressure or are compounded with too much sulfur,—I immerse them in a bath of aqueous solution of oxalic acid for a short time, say one to three hours according to size, and then wash them in water, after which the rubber will be found to possess the characteristics of properly vulcanized new rubber. Care must be taken in such cases not to continue the immersion too long.

Heretofore it has been proposed by the use of actetone or other like reagents to abstract from vulcanized rubber the free sulfur, and it has been known that by the use of sulfuric acid combined sulfur has been abstracted from vulcanized rubber. In the one case, however, the combined sulfur is not affected by the reagent, and in the other case the sulfuric acid is apt to injure the rubber as a commercial product, and changes its chemical and physical characteristics.

I believe myself to be the first to have provided any process of freeing or removing from vulcanized rubber sulfur which was combined therewith in the process of vulcanization and of thereby reclaiming the rubber or restoring it to substantially its original chemical and physical condition. Consequently I do not limit myself to the particular steps which I have herein described nor to the exact reagents which I have herein named, since I recognize that equivalents therefor may be employed without departing from the spirit and scope of my invention. Again, so far as certain phases of my invention or discovery are concerned, it is not essential that the process be carried on so far as to completely remove the combined sulfur, as it may be employed merely for counteracting oxidation or over-vulcanization as hereinbefore described, or else for separating only a portion of the comzined sulfur from the rubber mass.

So far as any generic features are concerned, this is a continuation in part of my application Serial No. 765,871, filed May 6, 1913.

I claim:

1. The herein described process of treating vulcanized rubber, which consists in subjecting such rubber to the action of oxalic acid.

2. The herein described process of reclaiming vulcanized rubber, which consists in heating such rubber to a temperature of not less than 120° C. in the presence of an organic acid soluble in water which will react on the combined sulfur.

3. The herein described process of devulcanizing vulcanized rubber, which consists in heating such rubber to a temperature at which sulfur becomes colloidal, splitting off molecularly combined sulfur by an organic acid soluble in water, and maintaining such temperature until combined sulfur is molecularly freed from the rubber by said acid.

4. The herein described process of devulcanizing vulcanized rubber, which consists in heating such rubber in a closed digester to the temperature of vulcanization, in the presence of an organic acid soluble in water capable of acting on the combined sulfur.

5. The herein described process of devulcanizing vulcanized rubber, which consists in heating such rubber in a closed digester to the temperature of vulcanization, in the presence of an organic dibasic acid capable of acting on the combined sulfur.

6. The herein described process of devulcanizing vulcanized rubber, which consists in heating such rubber in a closed digester to the temperature of vulcanization, in the presence of oxalic acid.

7. The herein described process of devulcanizing vulcanized rubber, which consists in gradually heating such rubber in a closed digester and in a solution of oxalic acid to a temperature at which rubber vulcanizes, maintaining such temperature for a predetermined period, and then washing the rubber.

8. The herein described process of reclaiming rubber from waste vulcanized rubber products containing cellulose, which consists in reducing such products to small particles, immersing the stock in a solution of an organic acid soluble in water, heating the same in a digester to a temperature of not less than 120° C. until the cellulose is disintegrated or made friable and combined sulfur freed from the rubber, and then washing the stock to clean the rubber.

9. The herein described process of devulcanizing vulcanized rubber, which consists in heating vulcanized rubber at a vulcanizing temperature in the presence of an excess quantity of an organic acid soluble in water.

10. The herein described process which consists in subjecting vulcanized rubber to the action of an organic acid soluble in water capable of freeing the combined sulfur, in the presence of a solvent capable of softening the rubber.

11. The herein described process which consists in treating vulcanized rubber with a solvent, and subjecting the same to the action of an organic acid soluble in water.

12. The herein described process which consists in treating vulcanized rubber with a solvent and with oxalic acid under heat and pressure.

13. The herein described process which consists in freeing sulfur from the vulcanized rubber molecule, by subjecting such vulcanized rubber under conditions of heat and pressure similar to those of vulcanization to the action of an organic acid capable of acting on combined sulfur.

In testimony whereof I have affixed my signature, in presence of two witnesses.

WILLIAM BEACH PRATT.

Witnesses:
 MARCUS B. MAY,
 P. W. PEZZETTI.